UNITED STATES PATENT OFFICE.

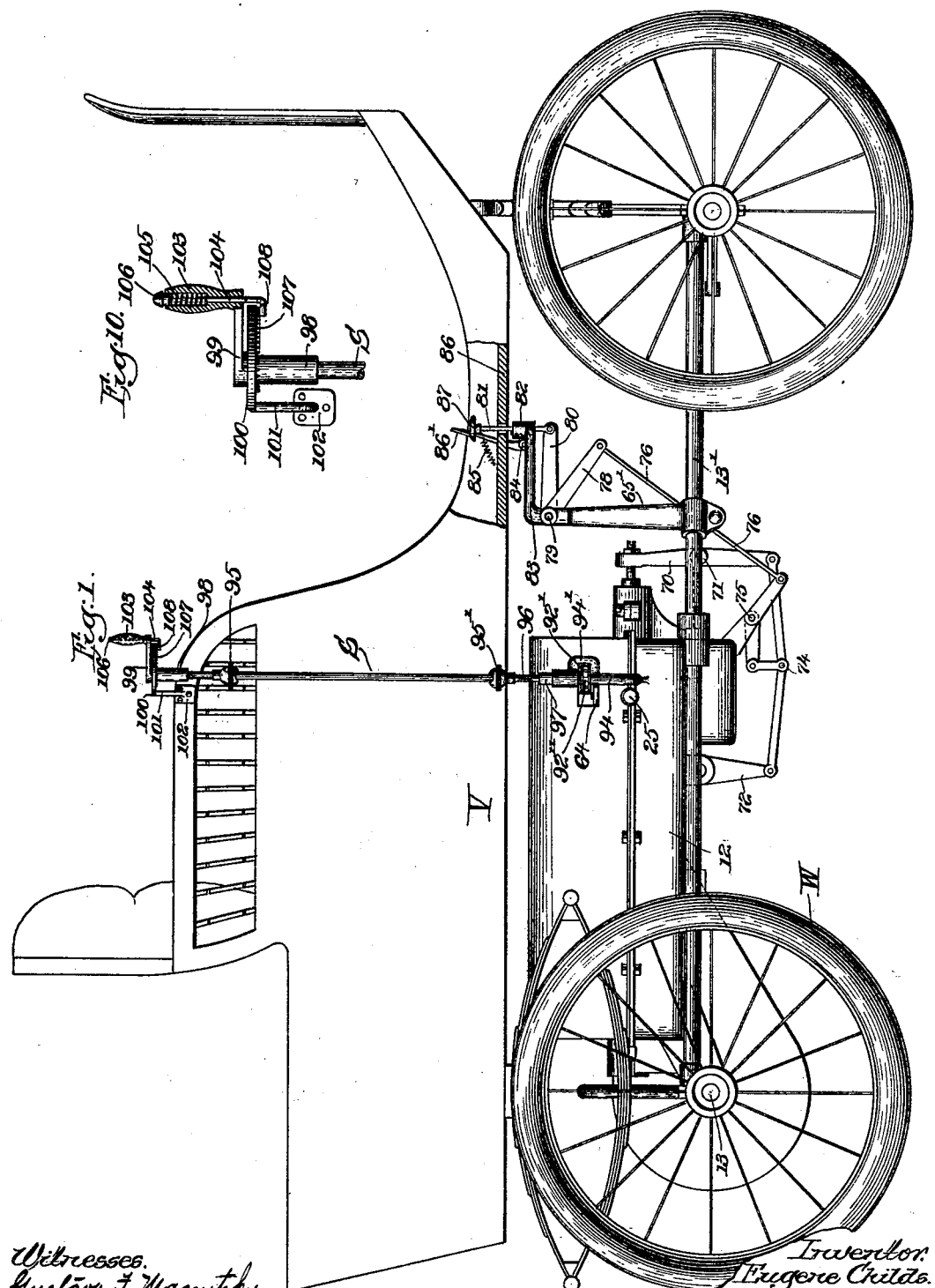

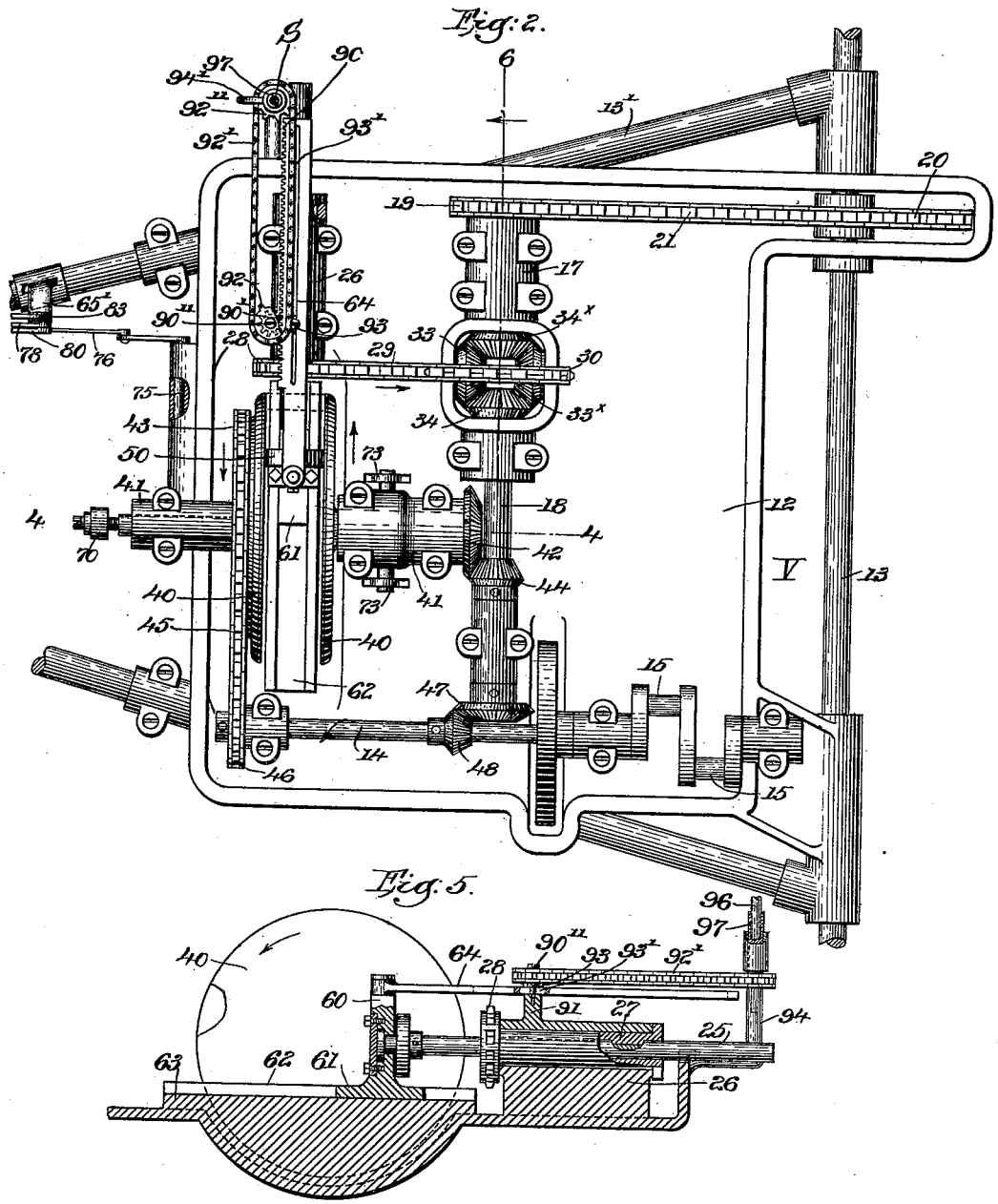

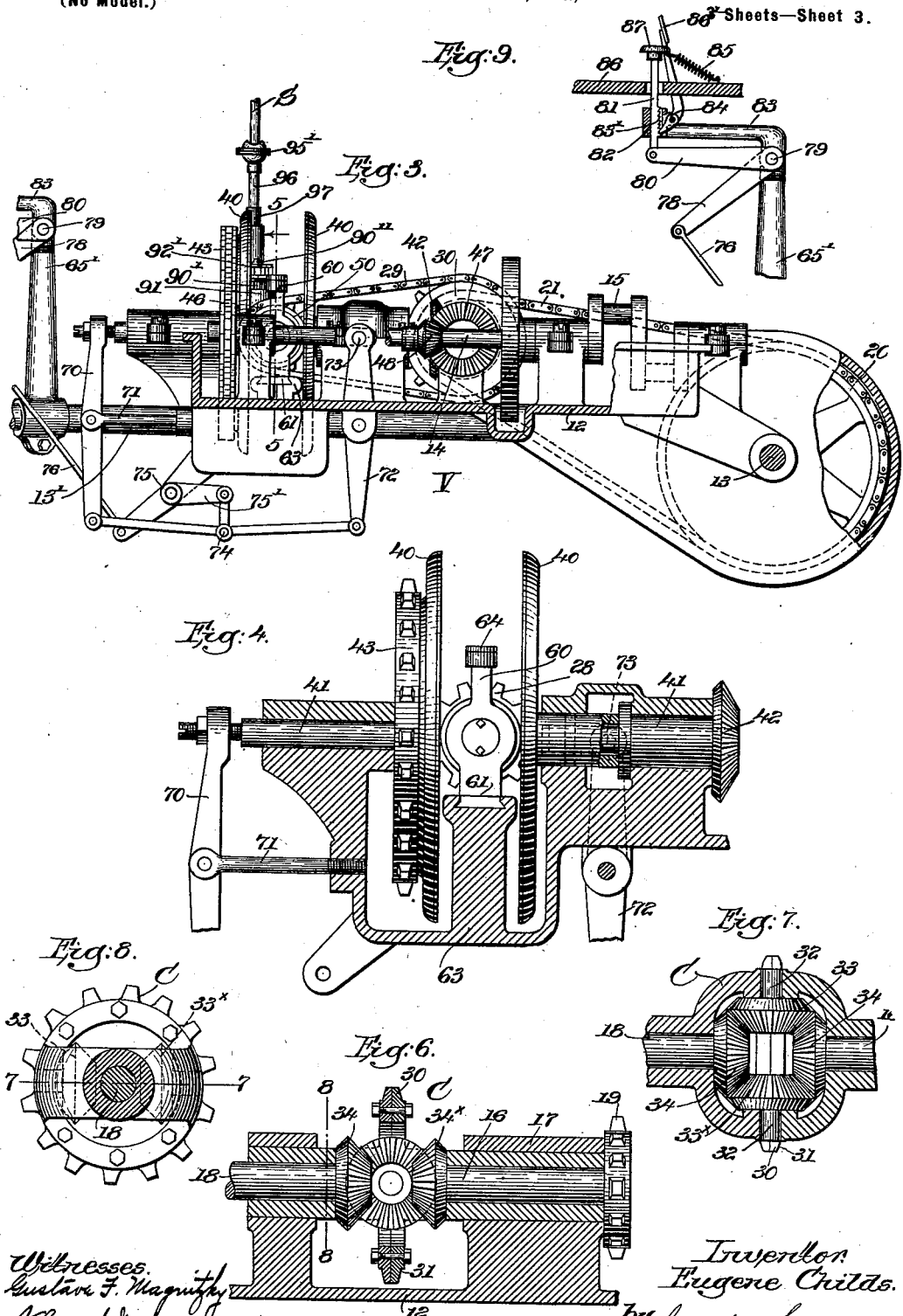

EUGENE CHILDS, OF BOSTON, MASSACHUSETTS, ASSIGNOR OF ONE-HALF TO EDWARD O. ELY, OF SAME PLACE.

VEHICLE DRIVING MECHANISM.

SPECIFICATION forming part of Letters Patent No. 646,803, dated April 3, 1900.

Application filed November 23, 1899. Serial No. 737,990. (No model.)

*To all whom it may concern:*

Be it known that I, EUGENE CHILDS, a citizen of the United States, residing at Boston, in the county of Suffolk and State of Massachusetts, have invented an Improvement in Vehicle Driving Mechanism, of which the following description, in connection with the accompanying drawings, is a specification, like letters and figures on the drawings representing like parts.

This invention relates to a vehicle driving mechanism, and the construction is such that many different speeds can be obtained and the changes from a slow speed to a fast speed, and vice versa, are secured gradually or progressively, thereby avoiding the objectionable and sudden jars or jolts frequently experienced in the ordinary types of motor-vehicles, and in the embodiment of the invention herein illustrated I obtain these gradual differential speeds from a shaft which rotates at a constant or uniform speed, and not only this, but I am enabled by my improved organization to stop the vehicle without arresting the action of the motor-shaft.

In the drawings, wherein the invention is shown in a convenient embodiment thereof, Figure 1 is a side elevation of a motor-vehicle equipped with driving mechanism constructed in accordance with my invention in a simple embodiment thereof. Fig. 2 is a top plan view of the differential driving and stopping mechanism. Fig. 3 is a side elevation as seen from the left of the vehicle, certain of the parts being broken away to illustrate more clearly certain features of the mechanism. Fig. 4 is a sectional side elevation, upon an enlarged scale, showing more particularly the speed-regulating medium and its adjacent parts, the section being taken in the line 4 4, Fig. 2. Fig. 5 is a transverse section taken on the line 5 5, Fig. 3, and looking in the direction of the arrow. Fig. 6 is a transverse sectional detail, the section being taken on the line 6, Fig. 2, looking in the direction of the arrow. Fig. 7 is a sectional elevation, the section being taken on the line 7 7, Fig. 8. Fig. 8 is a sectional elevation in the line 8 8, Fig. 6, as seen from the left. Fig. 9 is a sectional detail of means for controlling the frictional engagement between the disks and intermediate friction-wheel. Fig. 10 is a sectional detail of the manually-operative means upon the vehicle by which the driver controls the speed.

The improved vehicle driving mechanism, illustrated in a simple embodiment in the accompanying drawings, is of primary importance in connection with an automobile or motor-vehicle, as by its use I am enabled to obtain progressive or gradually increased or decreased speeds, and this without the necessity of stopping the motor.

In the drawings I have represented a vehicle of known construction and denote the same by V, and a boxing or casing 12 is mounted upon the running-gear thereof and incloses the working parts of the apparatus, and it has suitable hubs or bearings to receive the rear axle 13 of the vehicle, said axle being provided with the usual traction-wheels, the near ones W constituting propelling members by which the vehicle can be driven either forward or backward or completely stopped.

The motor for effecting the necessary operation of the wheels, either through the direct turning of the axle 13 or by rotating the wheels through the intervention of suitable coupling mechanism, may be of any kind—such as electric, steam, or explosion—and while the motor is not represented I have illustrated in the drawings the motor-shaft 14, which is operatively connected with the axle 13, and thereby with the wheels for rotating the same to drive the vehicle. Said motor-shaft is suitably supported upon the body of the vehicle and is shown as provided at one end with cranks 15, to which the pitmen or connecting-rods of the motor employed can be jointed in some convenient manner, although, of course, it is evident that the shaft 14 could otherwise be rotated.

While the invention in the embodiment thereof herein shown includes in its organization a continuously-driven motor-shaft, it is evident that the motion of the shaft can be intermittingly stopped; but I prefer to employ a continuously-operative shaft for the reason that by the mechanism hereinafter more particularly described I am enabled to secure high and low speeds and stoppage of the vehicle without arresting the motion of the motor-shaft, which is of great importance, the speed-regulating mechanism being conveniently located intermediate the motor-shaft 14 and a driven shaft, as 16. The driven shaft 16 is supported by the bearing 17 in the boxing 12 and is alined with the actuating-shaft 18, speed-controlling instrumentalities being coöperative with and located intermediate these parts for governing the speed of the driven shaft 16, and consequently of the axle 13, which is represented as connected therewith. Any suitable means may be furnished for connecting the driven shaft 16 with the axle 13; but for this purpose I have represented a sprocket connection consisting of the sprocket-wheels 19 and 20, secured to the shafts 16 and 13, respectively, and connected by the sprocket-chain 21.

I interpose between the actuating-shaft 18 and the driven shaft 16 a direction and speed controller, herein represented as a rotary box or cage having instrumentalities, such as gears, which operatively connect the actuating and driven shafts, whereby by change in the speed and direction of rotation of said controller I am enabled to run the vehicle or carriage either forward or backward, and also by varying the rotative speed of said controller through suitable speed-varying means, to be described, I am enabled to also vary the speed of the driven shaft, and I may also stop said driven shaft and the axle 13 and rear wheels W and while the motor and other shafts actuated by it are yet in motion, and this without shutting off the power of the motor. In the present case the wheels W are fixed to the rear axle, and from the foregoing it will be evident that said rear wheels can be stopped while the motor-shaft and some of the intermediate parts are still in motion, by reason of which the tires of said wheels act as a drag upon a road-bed to stop the vehicle, thereby avoiding the necessity of a separate brake upon the same.

The controller (herein designated by C) is represented as a cage having its center of motion substantially coincident with the center of motion of the actuating-shaft and the driven shaft, and this controller is provided with one or more power-transmitting elements, such as gears 33 and 33$^\times$, the gear 33 being essential, the gear 33$^\times$ performing chiefly the function of keeping the gear 33 in mesh with the gears 34 and 34$^\times$, the gear 34 being fixed to the actuating-shaft and the gear 34$^\times$ to the driven shaft.

The controller may be differentially actuated through suitable mechanism, such as speed-varying means, which serve to operate the same at very high or very low velocities, and the change between the two extremes can be varied very gradually or the vehicle can be stopped, so as to cause no inconvenience to an occupant or occupants of the same, such sudden stoppages or variations in the speed in existing forms of carriage being very disagreeable.

The controller C is shown as driven from the shaft 25, said shaft being slidable in the bearing 26 upon the forward side of the body 12 and having a keyway to receive a key upon the bushing or sleeve 27, located in the bore of the bearing, and said shaft carries a sprocket-wheel 28, secured to said bushing and rotative therewith and over which the sprocket-chain 29 travels, said sprocket-chain engaging the sprocket-teeth 30 upon the periphery of the controller C. The shaft 25 is slid back and forth in its bearing; but the sprocket-wheel 28 is not carried therewith on its reciprocation, and it is driven at different speeds for the purpose of governing the action of the coöperating elements mounted upon the controller C and the shafts 18 and 16.

The controller C consists of two substantially-similar sections, as 31, bolted or otherwise secured together at their inner ends and having bearings to receive the journals 32 of the bevel-gears 33, which mesh with the bevel-gears 34, secured to the ends of the shafts 16 and 18, respectively.

In conjunction with the controller C, I provide mechanism for effecting changes in speed of the controller, and consequently of the driven shaft 16, though of course the rotation of the motor-shaft may remain uniform.

For simplicity of construction the differential controlling mechanism which operates the controller at different speeds is actuated from the motor-shaft 14, and it is represented as including in its organization two friction-disks 40 of like construction, the adjacent faces of which are plain, the shafts 41 of which are supported outside said disks by bearings upon the boxing 12, and one of them carries a bevel-gear 42 and the other is represented as provided with a sprocket-wheel 43. The bevel-gear 42 meshes with a bevel-gear 44 upon the shaft 18, and the sprocket-wheel 43 is connected by the sprocket-chain 45 to the sprocket-wheel 46 upon the motor-shaft 14. The shaft 18 carries at one end the bevel-gear 47, meshing with the bevel-gear 48 upon the motor-shaft, and the construction is such that the two companion or duplicate disks 40 will be rotated positively in opposite directions at the same speed through the intervention of the two driving mechanisms just described, although, of course, it is obvious that other means may be employed for securing their rotation in unison.

In Fig. 2 I have indicated by the arrows the direction of rotation of certain of the parts, and it is evident, of course, that other elements, such as the rear axle 13, beyond those thus indicated will be turned first in one direction and then in another and at a different time wholly stopped. The friction-wheel 50, rotatively connected with the shaft 25, is interposed between and in contact with the working faces of the concentric driving-disks 40 and is movable diametrically across their centers, and as it moves toward and across such centers from a neutral position it will be driven at a progressively-decreased speed, and as it is oppositely operated from such neutral point it will be driven at a gradually-increased velocity, whereby corresponding results can be transmitted through the intermediate sprocket-chain 29 to the controller C. When the roll or wheel 50 is intersected by the centers of the two disks 40, it will not of course rotate, and in such a case as this the shaft 16 will be driven directly through the train of intermeshing bevel-gears supported upon the controller and shafts; but at other times the said shaft 16 will be driven either forward or backward or stopped in accordance with the position that the power-transmitting friction-wheel 50 may occupy, and in this connection it is stated that said wheel is ordinarily controlled manually and by means within convenient reach of the operator upon the vehicle-seat. With the friction-roll 50 occupying the position represented by the dotted lines in Fig. 2 the action will be as follows: It will be assumed that the motor-shaft 14 is being driven at a speed equal to six hundred revolutions to the minute, actuating-shaft eighteen thousand three hundred revolutions to the minute, and the power-transmitting elements between the motor-shaft and the two disks 40 are such that the said disks will be driven at a speed of two hundred revolutions to the minute, and when the friction-wheel is in the position shown by said dotted lines it will be driven at a speed of eight hundred revolutions to the minute, while the controller which carries the bevel-gears 33 and 33$^\times$ will be rotated two hundred times to the minute, and the bevel-gear 34$^\times$ will be rotated three hundred times to the minute. From this it will be seen that the controller C rotates two-thirds as fast and in the same direction as the left-hand bevel-gear 34, thereby causing the bevels 33 and 33$^\times$ to rotate about their own axis twenty-five times. Under the same condition the shaft 16, with bevel-gears 34$^\times$, will be rotated one hundred revolutions in a direction opposite to that indicated by the arrow.

To better illustrate the action of the carrier and shaft 16, the shaft 18 revolves three hundred revolutions per minute, while the carrier C is revolved two hundred times about the axis of shaft 18 and shaft 16, and it will be seen that the revolutions of the carrier are fifty revolutions faster than one-half the revolutions of shaft 18, or two hundred revolutions. With the carrier, however, revolving but one hundred and fifty revolutions per minute it will be seen that the shaft 16 will stand still, the action of shaft 18 being neutralized by the carrier through the bevel-gears 33 and 33$^\times$. When the speed of the controller is increased above that hereinbefore stated to a number of rotations more than one-half and in a direction opposite to the arrow thereon, the number of rotations of shaft 16 will be as the difference between shaft 18 and carrier C multiplied by two, or, following out the above principle, the revolutions of shaft 16 will be one hundred per minute in the direction opposite the arrow. By shifting the friction-wheel from the dotted-line position to the left of the point indicated by full lines the speed of the friction-wheel and connecting mechanism will be gradually decreased until at the point indicated the rotations of the carrier will be one-half the number of rotations of shaft 18, at which point shaft 16 will remain at rest, thus causing the carriage to stand still. By shifting the friction-wheel to the left of its full-line or neutral position the speed will be progressively increased and the shaft 16 will be oppositely rotated, although when said friction-wheel reaches the dead-center position of the disks 40 the shaft 16 will be driven directly through the train of intermeshing gears.

The wheel 50 is pinched between and is shifted back and forth diametrically of and across the centers of the disks 40, which are usually faced with leather, by manually-controlled means, and the shaft 25, which carries the same, has one end supported by the slide or block 60, having a wedge-shaped tongue or foot 61 to reciprocate in the correspondingly-shaped groove 62 upon the bearing 63. The link 64 is pivoted to the upper side of the head or block and constitutes a convenient means by which said slide can be operated back and forth to either stop the vehicle or to drive the same forward or backward at different speeds. The link 64 is in the nature of a rack, (see Fig. 2,) it having along one edge a multiplicity of teeth 90, adapted to be operated by the pinion 90', pivoted by the stud-screw 90'' to the bearing 91 upon the boxing 26. The stud-screw 90'' also passes through the sprocket-wheel 92, the pinion and the sprocket-wheel being keyed or otherwise secured to the stud-screw for movement in unison. The sprocket-wheel receives the sprocket-chain 92', which passes around a similar sprocket-wheel 92''. The sprocket-wheel 92'' is keyed to the vertical shaft S. By turning the shaft S the sprocket-chain, sprocket-wheels, and pinion will be operated, whereby the rack or link 64 will be moved back or forth in accordance with the direction the shaft may be turned, so that the position of the friction-wheel 50 relative to the disks 40 may be changed.

As the rack or link is pivoted to the friction-wheel I provide the guide 93, in the nature of a screw extending through the slot 93' and threaded into the bearing 91 to prevent lateral movement of the rack as it is moved to shift the friction-wheel.

The shaft S is sustained at its lower end by the vertical portion of a right-angular bearing 94, (see Fig. 1,) having the crank portion 94', in which the outermost sprocket-wheel 92'' can rotate.

The shaft S is manually operated and consists of a plurality of sections, certain of which are connected by ball-and-socket joints, as 95 and 95', so that the shaft can have lateral motion relative to its bearings without affecting the proper action of the vehicle and the driving mechanism therefor, even though said vehicle be subjected to jars and jolts, and the two lowermost sections of the shaft, designated, respectively, by 96 and 97, are telescopically connected, as shown in Fig. 5, whereby longitudinal movement of the shaft is permitted without possibility of throwing the mechanism out of action as the vehicle is jarred.

The shaft S is turned by a hand-lever within easy reach of the driver occupying the seat of the vehicle, so that the latter is perfectly under control at all times, and when the vehicle is stopped by arresting the motion of the rear axle in the manner previously described, with the friction-wheel in its intermediate position, the rear wheels will drag along the ground, and thereby the necessity of a second brake to stop the vehicle is avoided.

The upper end of the shaft S projects into the hub 98 of the hand-lever or crank-arm 99, extending through a bearing-opening in the sector or segmental plate 100, horizontally disposed and having a downwardly-extending arm 101, provided with a base or foot plate 102, secured in some suitable manner to the vehicle. The handle 103 of the crank-arm has a longitudinal bore to receive the spring-actuated bolt 104, the spring 105 of which is coiled within an enlarged chamber in the upper side of the handle. The head 106 of the bolt serves as a means for operating the same to release the crank-arm, as will now appear. The sector 100 has upon the under side thereof a series of teeth 107, adapted to cooperate with the offset 108 upon the lower end of the bolt 104, said offset or foot 108 being adapted to engage between two teeth of the series 107, thereby to lock the crank-arm 99 and the intermediate parts controlled thereby. When the head 106 is pressed downward by the driver, the foot or offset 108 of the spring-actuated bolt will be moved out of contact with the teeth 107, so that the crank-arm 99 can be swung in a desired direction to either drive the vehicle forward or backward or to stop the same.

The slide-shaft 41, to which the left-hand disk 40 is secured, (see Fig. 4,) is connected to the rocking lever 70, mounted upon the stud or pin 71, while the rocking lever 72 is connected with the right-hand slide-shaft 41, so that one or both disks can be forced into firm or pinching engagement with the intermediate wheel 50. The right shaft 41 has pivots 73, to which the branches of the bifurcated lever 72 are jointed, and the lower ends of the levers are connected to the links 74, pivoted to the third link 75', and said third link is pivoted to the rocking lever 75, to which the connecting-rod 76 is jointed. By thrusting the rod 76 down the upper ends of the levers 70 and 72 can be forced toward each other for throwing the faces of the friction-disks 40 firmly into contact with the friction-wheel 50 to insure a proper driving engagement or to take up any wear in the parts. The rod 76 is connected with the rock-arm 78 on the rock-shaft 79, having a second rock-arm 80, pivoted at its forward end (see Fig. 9) to the lower end of the actuating device or depressor-bar 81, projecting through the bore of the hub 82 upon the offstanding portion 83 of the standard 65' on the reach 13'. The bar 81 is in the nature of a ratchet having a series of vertical teeth 83', adapted to be engaged by the point of the pawl 84, pivoted upon the part 83 and held in its working position against jars and jolts while the carriage is in motion by the coiled spring 85, connected with the upper end of said pawl and with the floor 86 of the vehicle. The bar 81 terminates at its upper end in the enlarged portion 87, constituting a treadle, which can be depressed by the foot, so that through the intermediate arm 80, shaft 79, and rock-arm 78 the bar 76 can be thrust downward to simultaneously force the two disks toward each other and into contact with the intermediate wheel, the spring-actuated pawl 84 of course locking the parts in the desired position. To throw the disks out of engagement with the friction-wheel, the pawl 84 will be tripped, and to do this it is conveniently provided with a treadle 86, adapted to be kicked by the foot of the operator.

It is apparent that the apparatus is not limited to the mechanisms or parts hereinbefore described, for these may be variously changed, and that the ratio of speeds hereinbefore alluded to is simply a convenient one to indicate the advantages of the apparatus and also that certain parts may be easily dispensed with without departing from the scope of the claims.

Having described my invention, what I claim is—

1. In a vehicle driving mechanism, the combination with a vehicle having a propelling member, of two concentric disks disposed face to face and each of said faces being in a single plane, a friction-wheel movable entirely across the disks and in contact with the same at their common center, and means for actuating said propelling member at the time that the friction-wheel contacts with the dead-center of the disks.

2. In a vehicle driving mechanism, the combination with a vehicle having a propelling member, of two concentric disks disposed face to face and each of said faces being in a single plane, a friction-wheel movable entirely across the disks and in contact with the same at their common center, means for actuating said propelling member when the friction-wheel is upon the dead-center of the disk, and independent devices for driving each of said disks independently in opposite directions.

3. In a vehicle driving mechanism, a friction-wheel, two concentric disks maintained rigidly face to face in contact with said friction-wheel, means to move said friction-wheel across the disks at their common center, and mechanism for rotating said rigidly-maintained disks independently of each other in opposite directions.

4. In a vehicle driving mechanism, the combination with a vehicle having a propelling member, of the disk, a friction-wheel, means to place the friction-wheel with the disk at the center of rotation of the latter, said wheel being freely movable in contact with said disk in either direction from said center, connections between the disk and propelling member for actuating the latter, hand-controlled means for changing the position of the friction-wheel, and means independent of the disk for actuating said propelling member when the friction-wheel is in a dead-center position.

5. In a vehicle driving mechanism, two concentric disks, shafts carrying said disks, one of the shafts being mounted for sliding movement, a friction-wheel movable across said disks in contact therewith, and means to engage said sliding shaft to force the disk carried thereby toward its companion.

6. In a vehicle driving mechanism, two concentric disks, sliding shafts for supporting said disks, mechanism to rotate said shafts and to slide them toward each other, and a friction-wheel movable in contact simultaneously with the inside faces of both disks and driven thereby.

7. In a vehicle driving mechanism, two disks, sliding shafts to which said disks are secured, means for driving said disks oppositely, a friction-wheel movable in contact with the inside faces of said disks diametrically thereof, and means for sliding said shafts toward each other to force the disks in driving engagement with the intermediate friction-wheel.

8. In a vehicle driving mechanism, two concentric disks, an intermediate friction-wheel movable in contact simultaneously with the inside faces of said disks diametrically thereof and across their common center, keeping in contact with said disks throughout such movement, in combination with a vehicle having a propelling part operatively connected with said friction-wheel.

9. In a vehicle driving mechanism, two concentric disks, an intermediate friction-wheel movable in contact simultaneously with the inside faces of said disks diametrically thereof and across their common center, a lever connected with one of the disks and serving to move it toward its companion, in combination with a vehicle having an actuating device connected with said lever, and locking means for said device.

10. In a vehicle driving mechanism, two concentric disks, an intermediate friction-wheel movable in contact simultaneously with the inside faces of said disks and across their common center, two levers connected with the respective disks and serving to move them toward or from each other, and means for simultaneously operating said levers.

11. In a vehicle driving mechanism, two concentric disks, an intermediate friction-wheel movable in contact simultaneously with the inside faces of said disks and across their common center, in combination with a vehicle having an actuating device operatively connected with the disk, and a spring-operated locking device coöperative with said actuating device, said spring serving to normally hold the locking device in its effective position.

12. In a vehicle driving mechanism, a motor-shaft, a vehicle having a propelling member, connections between the motor-shaft and the propelling member for driving said propelling member, including a speed-controller having a movable member, and means actuated by said motor-shaft for driving said movable member at different speeds, said connections being operated direct from the motor-shaft when the means actuated by said motor-shaft is at rest, whereby the movable member of the controller will be held stationary.

13. In a vehicle driving mechanism, a motor-shaft, a vehicle having a propelling member, connections between the motor-shaft and the propelling member for driving said propelling member, including a speed-controller having a movable member, and means actuated by said motor-shaft for driving said movable member at different speeds, said means involving a disk and a friction-wheel movable in contact with the disk diametrically thereof, and said connections being operated direct from the motor-shaft when the friction-wheel is at rest, whereby the movable member of the controller will be held stationary.

14. In a vehicle driving mechanism, a continuously-rotating motor-shaft, two concentric disks, mechanism connected with said motor-shafts for driving the disks positively in opposite directions, a friction-wheel movable in contact simultaneously with the inside faces of said disks diametrically thereof and across their common center, in combination with a vehicle having a member operatively connected with said disk, the operative connections including two independent shafts and a speed and a direction controller uniting said shafts.

15. In a vehicle driving mechanism, two concentric disks, an intermediate friction-wheel movable in contact simultaneously with the inside faces of said disks diametrically thereof and across their common center, in combination with a vehicle having an axle provided with a fixed wheel, and operative connections between the axle and the friction-wheel, including two independent shafts and a speed and direction controller uniting said shafts.

16. In a vehicle driving mechanism, a disk, actuating and driven shafts, a controller operatively connecting said shafts, a friction-wheel movable across the face of the disk and its center diametrically thereof in opposite directions from a neutral position intermediate the center of the disk and the periphery thereof, and the disk acting to rotate the friction-wheel when the latter is in its neutral position and means between the friction-wheel and the controller for driving the latter at different speeds, said driven shaft being at rest when the friction-wheel is in its neutral position.

17. In a vehicle driving mechanism, a disk, actuating and driven shafts, a controller operatively connecting said shafts, a friction-wheel movable across the face of the disk and its center diametrically thereof in opposite directions from a neutral position intermediate the center of the disk and the periphery thereof, and means between the friction-wheel and the controller for driving the latter at different speeds, said driven shaft being at rest when the friction-wheel is in its neutral position, and the friction-wheel being rotated by said disk when in said neutral position, in combination with a vehicle having a propelling member operated by said driven shaft.

18. In a vehicle driving mechanism, a disk, actuating and driven shafts, a controller operatively connecting said shafts, a friction-wheel movable across the face of the disk and its center diametrically thereof in opposite directions from a neutral position intermediate the center of the disk and the periphery thereof, and means between the friction-wheel and the controller for driving the latter at different speeds, said driven shaft being at rest when the friction-wheel is in its neutral position, in combination with a vehicle having a propelling member operated by said driven shaft, and a continuously, uniformly driven, motor-shaft upon the vehicle operatively connected with said disk.

19. In a vehicle driving mechanism, a disk, a friction-wheel driven by the disk and movable diametrically across its face and its center diametrically thereof, in combination with a vehicle having a propelling member adapted to be driven by the friction-wheel, and operative connections between the friction-wheel and said member to be driven, including a speed and direction controller kept in motion while said propelling member is at rest, and manually-controlled means upon the vehicle for changing the position of the friction-wheel.

20. In a vehicle driving mechanism, a disk, a friction-wheel movable across the face of the disk and driven thereby, in combination with a vehicle having a driven propelling member adapted to be driven by said friction-wheel, operative connections between said last-mentioned parts including a speed and direction controller kept in motion while said propelling member is at rest, and manually-controlled means upon the vehicle for changing the position of the friction-wheel.

21. In a vehicle driving mechanism, two concentric disks, a continuously, uniformly driven, motor-shaft, an actuating-shaft operated by the motor-shaft, separated connections between the actuating-shaft and the motor-shaft for driving said disks positively in opposite directions, a friction-wheel intermediate the disks, a driven shaft, and a speed and direction controller coupling the actuating and driven shafts and operatively connected with the friction-wheel.

22. In a vehicle driving mechanism, a disk, a friction-wheel movable diametrically across the disk, and means for operating said disk, in combination with a vehicle having a propelling member adapted to be driven, and connections between said propelling member and the friction-wheel, for effecting the rotation of the propelling member in opposite directions, and to stop the movement of said propelling member by change of position of the friction-wheel with relation to its disk and without stopping the rotation of said friction-wheel.

23. In a vehicle driving mechanism, a motor-shaft, a vehicle having a propelling member, connections between the motor-shaft and the propelling member for driving said propelling member, including a speed-controller having a movable member, a disk, a friction-wheel movable in contact with the disk diametrically thereof, operating mechanism between the friction-wheel and said movable member, means to change the position of the friction-wheel to a neutral position without stopping the same when it is desired to stop said propelling member, and operating connections between the motor-shaft and said disk.

24. In a vehicle driving mechanism, the combination of the following instrumentalities, viz: an actuating-shaft, suitable means to rotate it, a driven shaft, a controller interposed between and operatively coupling said actuating and driven shafts, an axle for said vehicle, connecting devices between said driven shaft and said axle, two disks, means for rotating the same in opposite directions at the same speed, a slidable shaft having a friction-wheel interposed between and acted upon diametrically by said disks to rotate the shaft carrying said wheel, a suitable connection between the shaft carrying said friction-wheel and said controller, and means under the control of the driver for sliding the shaft carrying the friction-wheel that said wheel may be moved diametrically between said friction-disk and the said shaft be rotated at any desired speed in one or the other direction according to the speed of said friction-wheel between said disks, the connection between the shaft driven by the friction-wheel and the said controller consequently actuating the driven shaft and the connected axle at the speed and in the direction predetermined by the position of the friction-wheel with relation to said friction-disks.

25. In a vehicle driving mechanism, an axle, an actuating-shaft, suitable means to rotate the same at a uniform speed, a driving-shaft adapted to be driven at a variable speed, means to connect said driving-shaft with said axle to rotate the same, a controller operatively connecting the said actuating and driven shafts, two opposed friction-disks, means to rotate them at the same speed but in opposite directions, a sliding shaft having a friction-wheel, means to connect said friction-wheel with said controller to rotate the same in one or the other direction and at any desired speed, means to force the friction-disks firmly in contact with said friction-wheel at diametrically-opposite points that said friction-disks may positively drive said wheel and its shaft, and means under the control of the driver to change the position of the said friction-wheel diametrically with relation to the faces of said friction-disks to insure the desired speed for a direction of motion and said controller to provide for rotating said axle, as it may be desired to move the carriage forward or backward at the desired speed.

26. In a vehicle driving mechanism, oppositely-rotatable friction-disks and means to move the same positively at the same speed, a friction-wheel interposed between said disks, means to cause said disks to pinch said friction-wheel diametrically to insure the positive rotation of said wheel and the shaft upon which it is mounted, a suitable guide to sustain said shaft, a device under the control of the operator to slide said guided shaft while the friction-wheel is being moved diametrically with relation to the friction-disk, and suitable devices under the control of the shaft carrying said friction-disk to determine the direction and speed of rotation of the axle of said vehicle.

27. In a vehicle driving mechanism, an axle, an actuating-shaft, means to operate the same, a driven shaft, means to connect it with said axle, a rotatable controller having gearing and connecting the said actuating and driven shafts, a shaft having a friction-wheel, means for connecting said shaft operatively with said controller, a guide to direct the movement of said shaft and its friction-wheel, means under the control of the driver of the vehicle to slide said guided shaft and its attached friction-wheel, and two opposed disks coactive with said friction-wheel at diametrically-opposite points, means to positively rotate said friction-disks oppositely at the same speed, and means to control the degree of pressure of said disks upon said wheel or to move said disks to release said wheel from pressure and stop its rotation.

28. The combination with a vehicle and with a part thereof to be operated, of a motor-shaft upon the vehicle, an actuating-shaft operable by the motor-shaft, a driven shaft operatively connected with the part of the vehicle to be operated, a controller provided with a series of coöperative driving elements, one of which is secured to the actuating-shaft and the other of which is connected to the driven shaft, a disk actuated by said motor-shaft, a friction-wheel and its shaft, said friction-wheel being movable diametrically across the face of the disk, and driving connections between said friction-wheel shaft and said controller.

29. The combination with a vehicle and a part thereof to be operated, of a motor-shaft upon the vehicle, an actuating-shaft operable by the motor-shaft, a driven shaft operatively connected with the part of the vehicle to be operated, a rotative speed-controller interposed between said actuating and driven shafts and operatively connecting the same, two parallel disks oppositely rotative and each operatively connected with the motor-shaft to be rotated thereby, a shaft provided with a friction-wheel movable completely across and in contact with both disks diametrically thereof, and driving connections between said last-mentioned shaft and said controller.

30. The combination with a vehicle and a part thereof to be operated, of a motor-shaft upon the vehicle, an actuating-shaft operable by the motor-shaft, a driven shaft operatively connected with the part of the vehicle to be operated, a rotative speed-controller interposed between said actuating and driven shafts and operatively connecting the same, two parallel disks oppositely rotative and each operatively connected with the motor-shaft to be rotated thereby, a shaft provided with a friction-wheel movable completely across and in contact with both disks diametrically thereof, driving connections between said last-mentioned shaft and said controller, and a sliding block disposed between said disks and supporting said friction-wheel shaft.

31. The combination with a vehicle and a part thereof to be operated, of a motor-shaft upon the vehicle, an actuating-shaft operable by the motor-shaft, a driven shaft operatively connected with the part of the vehicle to be operated, a rotative speed-controller interposed between said actuating and driven shafts and operatively connecting the same, two parallel disks oppositely rotative and each operatively connected with the motor-shaft to be rotated thereby, a shaft provided with a friction-wheel movable completely across and in contact with both disks diametrically thereof, driving connections between said last-mentioned shaft and said controller, a sliding block disposed between said disks and supporting said friction-wheel shaft, a link pivoted to said sliding block, and a lever jointed to said link.

32. The combination with a vehicle and with a part to be driven thereby, of an actuating-shaft, a disk operatively connected with said actuating-shaft, a driven shaft serving to actuate the part of the vehicle to be operated, means for operating the actuating-shaft at a continuous speed, a controller interposed between the actuating and driven shafts and serving to couple the same, a sliding block, a shaft supported by said sliding block and provided with a friction-wheel adapted to engage one of the faces of the disk, means for moving said sliding block back and forth, and driving connections between said controller and the shaft that carries the friction-wheel.

33. The combination with a vehicle and a part thereof to be operated, of a uniformly-driven motor-shaft upon the vehicle, an actuating-shaft operable by the motor-shaft, a driven shaft operatively connected with the part of the vehicle to be operated, a rotative controller interposed between said shafts and operatively coupling the same, a pair of oppositely-rotative disks both driven by said motor-shaft, a friction-wheel located to engage the faces of both disks and to completely cross the same diametrically thereof, a shaft carrying said friction-wheel, bearings for said shaft, one of which is fixed and the other of which consists of a slidable block, means for moving the block back and forth between the disks, and mechanism for moving the disks into firm engagement with the periphery of the friction-wheel thereby to take up wear in any of said parts.

34. The combination with an actuating-shaft, a driven shaft, a controller interposed between said shafts and operatively coupling the same, a pair of disks each provided with a sliding shaft, means for rotating said sliding shaft and the actuating-shaft at a uniform speed, a friction-wheel between and driven by said disks, operative connections between said friction-wheel and said controller, means for moving said friction-wheel back and forth diametrically of and in contact with the faces of said disks, a pair of levers operatively connected to said sliding shafts, and mechanism connecting the same for operating them in unison.

35. The combination with an actuating-shaft, a driven shaft, a controller interposed between said shafts and operatively coupling the same, a pair of disks each provided with a sliding shaft, means for rotating said sliding shafts and the actuating-shaft at a uniform speed, a friction-wheel between and driven by said disks, operative connections between said friction-wheel and said controller, means for moving said friction-wheel back and forth diametrically of and in contact with the said sliding shafts, a pair of levers operatively connected to said sliding shafts, a toggle connecting the levers, a third lever operatively connected to the toggle, and foot-controlled means for operating said third lever.

36. The combination with an actuating-shaft, of a driven shaft a rotative controller interposed between and operatively coupling said shafts, a disk, means for rotating said disk, a fixed bearing, a bushing supported within the same, a sliding shaft inclosed by the bushing and keyed thereto, a driving device upon said shaft, said driving device being secured to the bushing and operatively connected to the controller, a friction-wheel carried by said shaft and located to engage the face of the disk and to move completely across the same diametrically thereof, and a sliding block to support said sliding shaft.

37. The combination with a vehicle having a propelling member, of a driven shaft operatively connected with said propelling member, an actuating-shaft, a motor-shaft operatively connected with the actuating-shaft, a controller disposed between and coupling the actuating-shaft and the driven shaft, said controller being provided with a series of power-transmitting elements, and speed-changing mechanism driven by the motor-shaft and connected with said controller, the vehicle being stopped by changing the relative speeds of said power-transmitting elements and without stopping the controller.

38. In a vehicle driving mechanism, a propelling member, a continuously-driven motor-shaft, two concentric friction-disks rotated continuously from said motor-shaft in opposite directions, a shaft having a friction-wheel which is pinched between the said disks, the latter operating upon said friction-wheel at substantially diametrically-opposite points to thereby rotate said friction-wheel when it is desired that the carriage be propelled, connections between the shaft carrying said friction-wheel and said propelling member, a device under control of the driver of the carriage to put the friction-wheel in its neutral position with relation to said friction-disks that the carriage may remain at rest while the friction-disks, the friction-wheel, and the motor-shaft continue to rotate, the movement of the friction-wheel from its neutral position in either direction enabling the carriage to be immediately started.

39. In a vehicle driving mechanism, a vehicle having a propelling member the rotation of which propels the vehicle, a shaft having a friction-wheel, connections between said friction-wheel and said propelling member, to actuate the latter to move the vehicle in the desired direction either forward or backward, two concentric friction-disks adapted to engage said friction-wheel, means to rotate said disks at the same speed in opposite directions, pressure-controlling means to control the distance of the face of one of said disks from the face of the other disk, to thereby regulate the pressure of said disks against the periphery of said friction-wheel, said friction-wheel when in its neutral position being driven at such a rate of speed as to arrest the action of said propelling member and consequently the movement of the vehicle.

40. In a vehicle driving mechanism, a propelling member, the rotation of which propels the vehicle, a shaft having a friction-wheel, connections between said shaft and said propelling member to actuate the latter and move the vehicle in the desired direction, two friction-disks, independent mechanisms to rotate said disks in opposite directions and to vary the distance between their acting faces to pinch between them more or less said friction-wheel, the said friction-wheel when in its neutral position being driven at such a rate of speed as to arrest the action of said propelling member and consequently the movement of the vehicle.

41. In a vehicle driving mechanism, a propelling member, the rotation of which propels the vehicle, a shaft having a friction-wheel, connections between said shaft and said propelling member to actuate the latter and move the vehicle in the desired direction, two friction-disks, independent mechanisms to rotate said disks in opposite directions and to vary the distance between their acting faces to pinch between them more or less said friction-wheel, the said friction-wheel when in its neutral position being driven at such a rate of speed as to arrest the action of said propelling member and consequently the movement of the vehicle, and means to vary the position of said friction-wheel between said disks to start the vehicle.

42. In a vehicle driving mechanism, the combination with a vehicle having a propelling member, of two concentric disks, an intermediate friction-wheel movable in contact simultaneously with the inside faces of said disks diametrically thereof and across their common center, a shiftable member coöperative with and serving to operate the friction-wheel to change its position relatively to the disks, a locking member for said shiftable member, and means independent of the friction-disks for driving the vehicle when the friction-wheel is upon a dead-center position.

43. In a vehicle driving mechanism, two concentric disks, an intermediate friction-wheel movable in contact simultaneously with the inside faces of said disks diametrically thereof and across their common center, a shiftable member coöperative with, and serving to operate the friction-wheel to change its position relatively to the disks, and a spring-controlled locking device for said shiftable member.

44. In a vehicle driving mechanism, two concentric disks, an intermediate friction-wheel movable in contact simultaneously with the inside faces of said disks diametrically thereof and across their common center, a telescopic shaft operatively connected to the friction-wheel, and means for rotating said shaft.

45. In a vehicle driving mechanism, a disk, a friction-wheel movable in contact with the inside face of said disk diametrically across its center, a telescopic shaft consisting of a plurality of sections connected by a ball-and-socket joint and serving to shift said friction-wheel, a lever connected to the shaft for turning the same, and a locking device for said lever.

46. In a vehicle driving mechanism, two concentric disks, an intermediate friction-wheel movable in contact simultaneously with the inside faces of said disks diametrically thereof and across their common center, a sector having teeth, a lever operatively connected with the friction-wheel and serving to move the same back and forth, and a locking device coöperative with the lever and adapted to engage the teeth of the sector.

47. In a vehicle driving mechanism, the combination with a vehicle having a propelling member, of a motor-shaft mounted upon the vehicle, driving connections between the motor-shaft and the propelling member, and instrumentalities coöperative with the said driving connections and serving to effect the stoppage of said propelling member without stopping said speed and direction controller.

48. In a vehicle driving mechanism, a disk, a friction-wheel driven by the disk and movable across the face thereof, in combination with a vehicle having a propelling member adapted to be driven by the friction-wheel, operative connections between the friction-wheel and said member to be driven, including a speed and direction controller, a shiftable member upon the vehicle coöperative with and serving to change the position of the friction-wheel, and a locking device for said shiftable member.

49. In a vehicle driving mechanism, a vehicle having a propelling member, a shaft having a friction-wheel, connections between said shaft and said propelling member to actuate the latter to move the vehicle in the desired direction, either forward or backward, or to stop the same, two concentric friction-disks adapted to engage said friction-wheel, means to rotate said disks at the same speed in opposite directions, the friction-wheel when in its neutral position being driven at such a rate of speed as to arrest the action of said propelling member and consequently the movement of the vehicle, and means to lock the friction-wheel in said neutral position.

50. In a vehicle driving mechanism, a vehicle having a propelling member, a shaft having a friction-wheel, connections between said friction-wheel and said propelling member to actuate the latter to move the vehicle in the desired direction either forward or backward, two concentric friction-disks adapted to engage said friction-wheel, and said friction-wheel when in its neutral position being driven at such a rate of speed as to arrest the action of said propelling member and consequently the movement of the vehicle, a shaft shiftable relatively to the friction-wheel and connected therewith to change the position thereof, a shiftable member serving to operate said shaft, and means to lock the shiftable member in a desired position.

In testimony whereof I have signed my name to this specification in the presence of two subscribing witnesses.

EUGENE CHILDS.

Witnesses:
HEATH SUTHERLAND,
MARGARET A. DUNN.